G. F. HELSON.
WRAPPING MACHINE.
APPLICATION FILED FEB. 28, 1917.
1,255,009.
Patented Jan. 29, 1918.
4 SHEETS—SHEET 1.
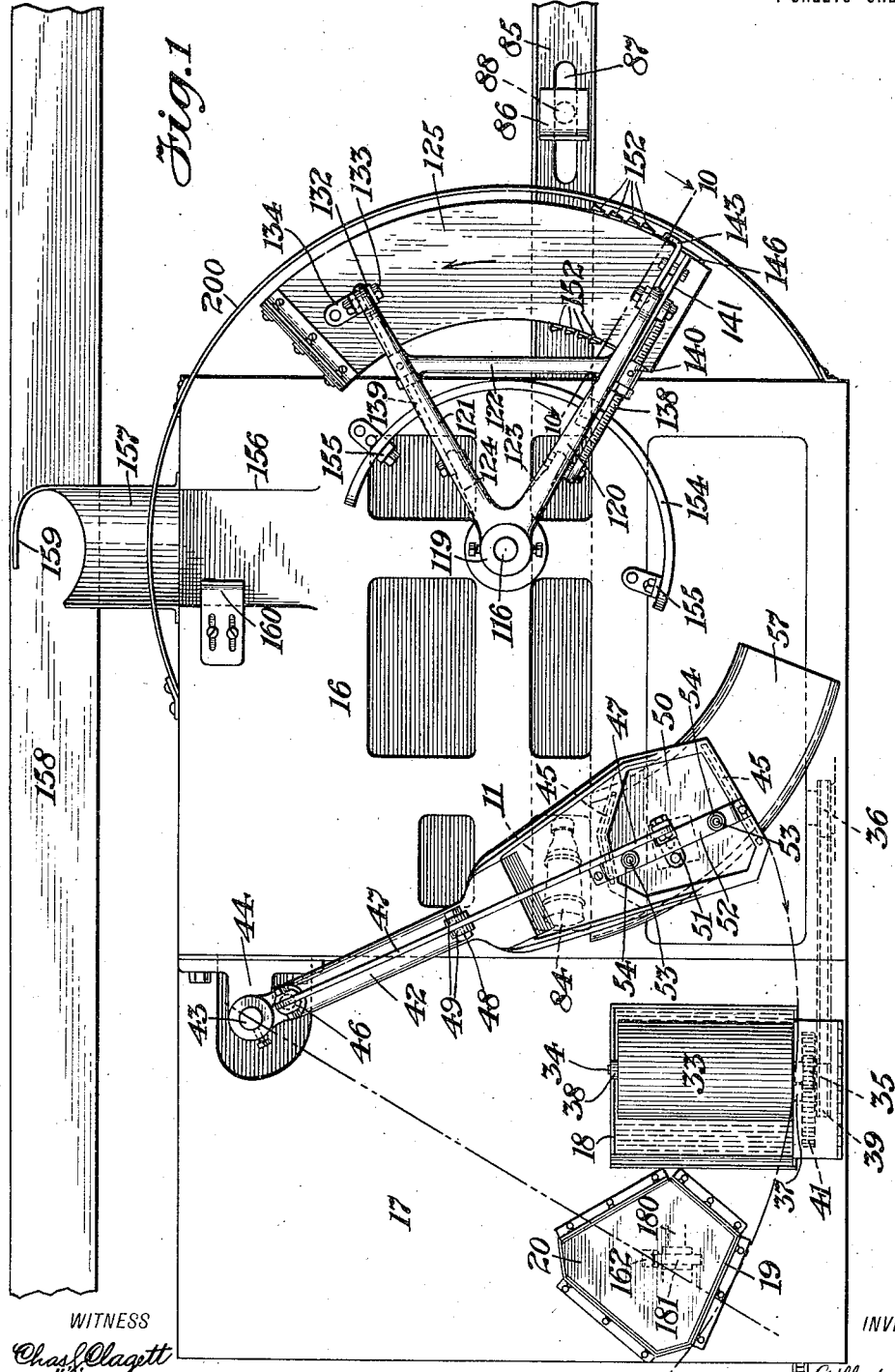

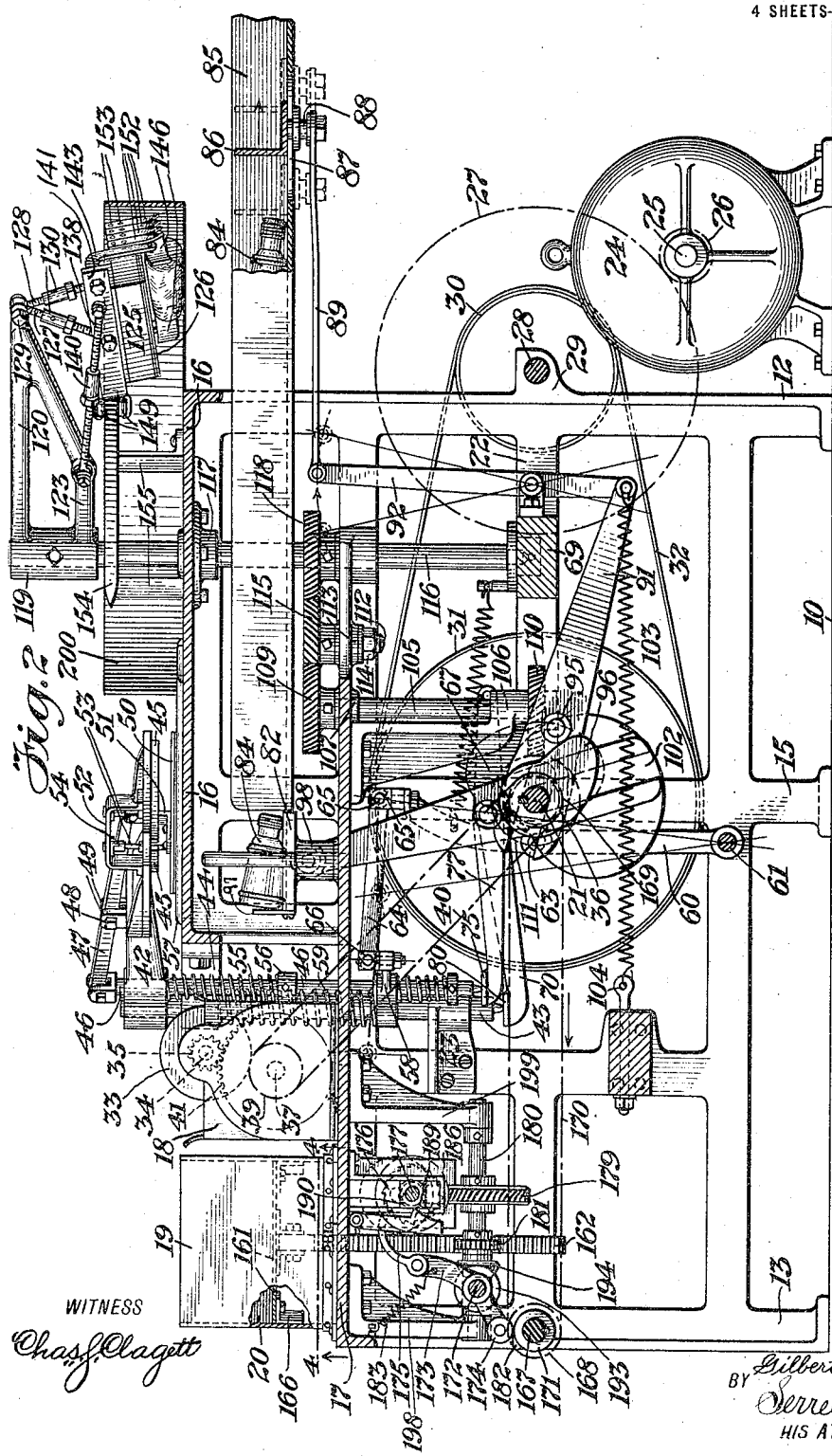

G. F. HELSON.
WRAPPING MACHINE.
APPLICATION FILED FEB. 28, 1917.
1,255,009.
Patented Jan. 29, 1918.
9 SHEETS—SHEET 3.
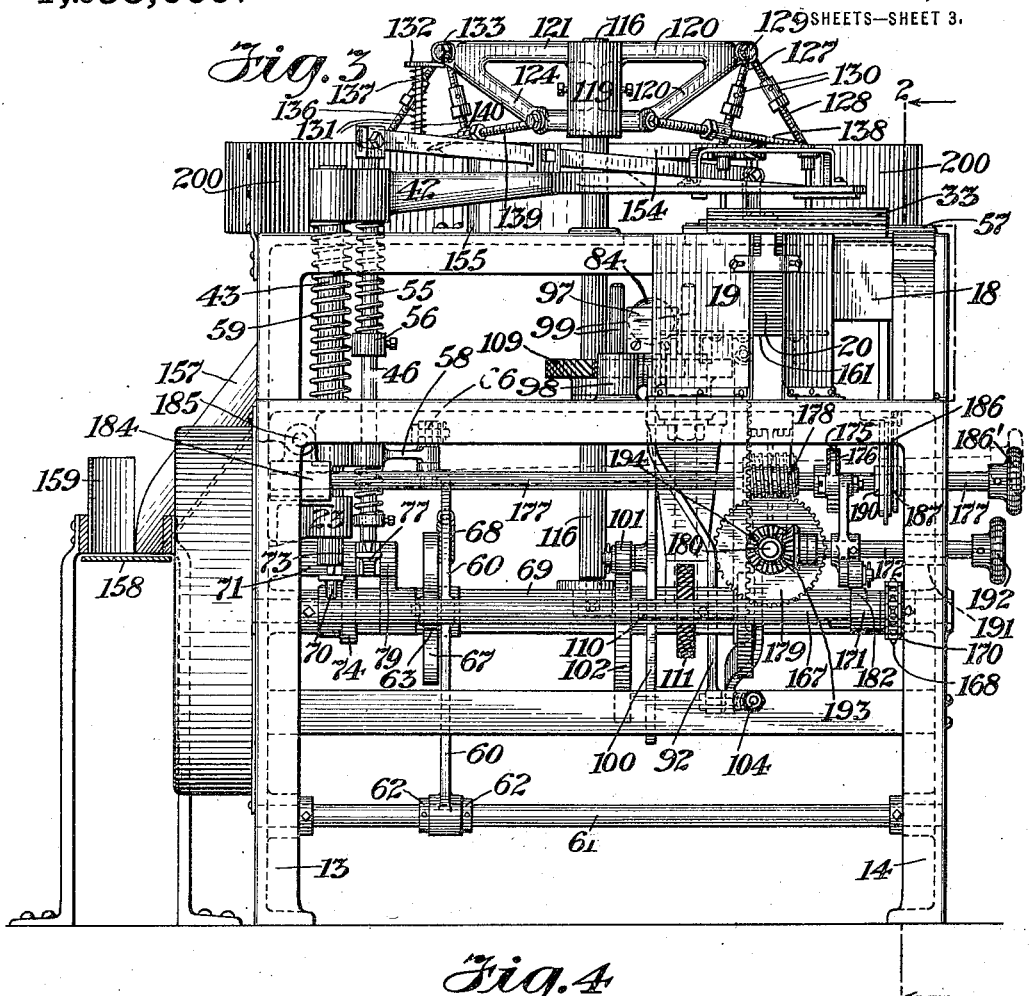
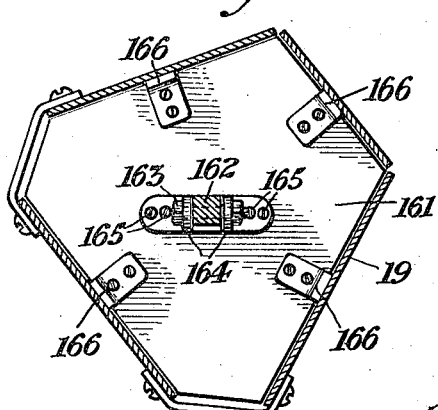
WITNESS
Chas. F. Clagett
INVENTOR
Gilbert F. Helson
BY Serrell + Son
HIS ATTORNEYS.

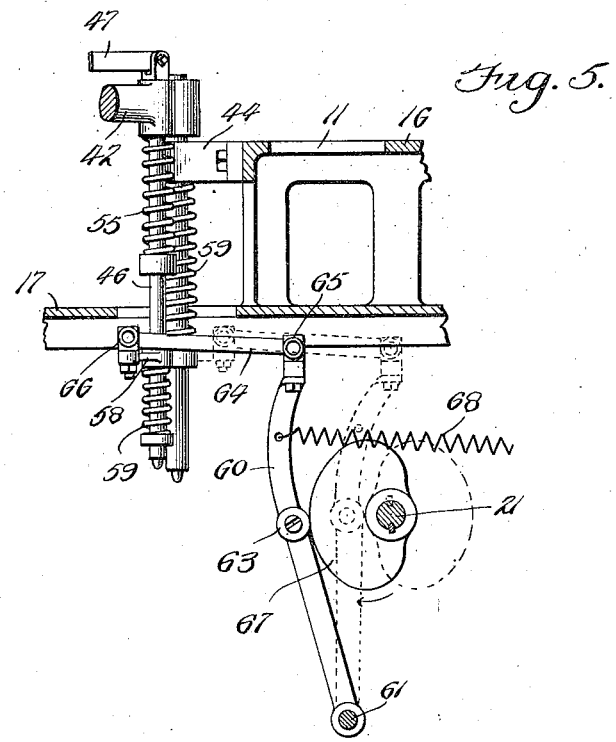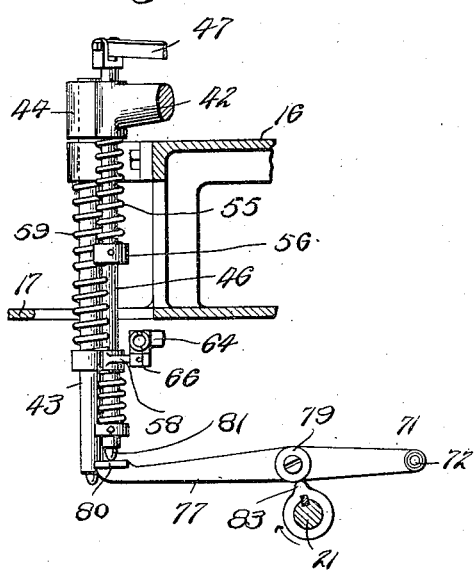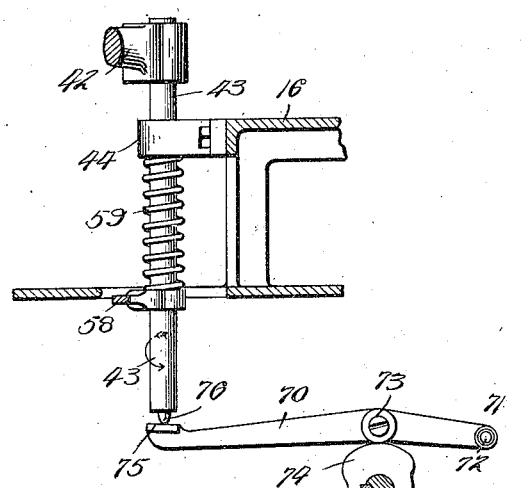

UNITED STATES PATENT OFFICE.

GILBERT F. HELSON, OF NEW YORK, N. Y., ASSIGNOR TO E. R. DURKEE AND COMPANY, OF NEW YORK, N. Y., A FIRM.

WRAPPING-MACHINE.

1,255,009.   Specification of Letters Patent.   Patented Jan. 29, 1918.

Application filed February 28, 1917. Serial No. 151,397.

*To all whom it may concern:*

Be it known that I, GILBERT F. HELSON, a subject of the King of Great Britain, but having declared my intention of becoming a citizen of the United States, residing at the borough of Richmond, in the county of Richmond, city and State of New York, have invented an Improvement in Wrapping-Machines, of which the following is a specification.

My invention relates to machines for placing wrappers upon bottles, cans, or other cylindrical articles, and particularly to mechanism for applying paste to the wrappers and conveying and depositing them one at a time upon the bed of the machine to be afterward wrapped around the articles by suitable means. I prefer to employ the bottle feeding and elevating means, and the wrapping block herein shown, but which form the subject matter of separate co-pending applications filed by me August 9, 1917, Serial Nos. 185,275 and 185,276.

Figure 1 is a plan view.

Fig. 2 is a vertical section on line 2—2 of Fig. 3.

Fig. 3 is a rear end elevation.

Fig. 4 is a sectional view of the wrapper box on the line 4—4 of Fig. 2.

Fig. 5 is a detail view of the wrapper carrying mechanism.

Fig. 6 is a detail view of the wrapper release mechanism.

Fig. 7 is a detail view of the wrapper carrier as it is returning from the wrapper box to the bed of the machine.

Similar reference characters denote like parts throughout the several views. The frame of the machine is approximately rectangular. 12, 13, 14 and 15, indicate uprights which are bolted or otherwise secured at their lower ends to a base or floor 10. The top of the frame is stepped, forming a main bed 16 extending longitudinally the full length of the frame at its front, and a lower bed 17, at the rear, upon which are supported a paste or glue box 18, and a feed box or holder 19 for the wrappers 20.

21 indicates the main shaft which is journaled at its respective ends in the cross beams 22 there being one of these beams on each side of the frame.

24, designates the motor, upon the shaft 25, of which is secured a gear 26, meshing with a gear 27 fixed to a shaft 28, journaled in bearings in a bracket 29 fixed to the frame at the front of the machine in line with the main shaft 21.

Fixed to the shaft 28 at one side of the gear 27 is a pulley 30.

31, indicates a pulley fixed to the main shaft 21 adjacent one end. 32, indicates the drive belt which passes around the pulleys 30 and 31.

33, indicates a roller fixed upon a shaft 34 journaled in the ends of the paste or glue box 18, one end of which shaft outside the box is provided with a fixed gear 35.

36, designates a sprocket wheel secured to the main shaft 21. 37, is a horizontal shaft supported in bearings 38, above the bed 17, and having fixed upon it a sprocket wheel 39. 40, indicates a sprocket chain connecting the sprocket wheel 39 and the sprocket wheel 36 upon the main shaft 21. 41, is a gear secured upon the shaft 37 and meshing with the gear 35, upon the axis of the roller 33. It will be seen that by this mechanism the roller 33 will be continuously rotated within the glue or paste box 18, while the main shaft 21 is revolving.

The wrappers 20 are fed upwardly within the box or holder 19, in such manner that the uppermost wrapper will always be at or near the top of the holder 19. I prefer to employ the mechanism shown for this purpose.

The wrappers, one at a time, in rapid succession are glued along two or more edges, taken from the holder 19, and deposited upon the main bed 16 of the machine by the mechanism next described.

The wrapper carrier consists of a swinging arm 42, one end of which is fixed to the top of a vertical shaft 43, rotatable in and supported by a bracket 44, secured to the top of the frame of the machine at one corner and at the rear of the main bed 16. This shaft 43, also passes through an opening in a supporting bracket 23, secured to the frame of the machine.

The arm 42 has a broadened and flattened extension at its free end which is provided with an opening corresponding to the shape of the wrappers. Upon the underside of the free end of the arm 42, and at or adjacent one or more edges of the opening therein, there are secured glue collecting strips 45, which project somewhat below the under surface of the arm.

In the under portion of the arm 42 at a predetermined distance from its connection to the vertical shaft 43, there is a circular opening through which passes the upper end of a vertical rod 46. To the upper end of this rod 46 there is pivotally connected one end of a lever bar 47, fulcrumed at 48, between two upright lugs 49, upon the top of the arm 42.

50, indicates a wrapper release plate of a shape corresponding with the opening in the swinging arm 42, and loose fitting therein; upon the upper surface of this plate 50, there is secured a lug 51, to which the other end of the lever bar 47 is pivotally connected.

Secured to the top of the swinging arm 42 at either side of the opening therein and straddling said opening in a raised position is a guide strip 52 provided with one or more openings for the reception of two vertical pins 53 secured at their lower ends to the top of the plate 50. These openings are preferably surrounded by bosses or short tubes 54 to guide the up and down movement of the pins 53.

The plate 50 normally occupies a position within the opening in the swinging arm 42, with its lower surface flush with the under surface of the arm, and is held in such position by the spiral spring 55 which surrounds the vertical rod 46 and bears against the under surface of the arm 42 at its top while its lower end bears against a collar 56 secured to said rod 46 at a predetermined distance below the swinging arm.

When the machine is at rest the swinging arm 42 occupies a position over the top of the bed 16 raised a predetermined distance above an elongated pad 57 secured upon the top of said bed.

58, indicates a crank-arm secured to the vertical shaft 43 at a predetermined distance below the bracket 44, and 59, is a spiral spring surrounding the shaft 43 between said crank-arm and bracket.

60, indicates a vertical arm pivoted at its lower end upon a stationary rod or shaft 61 secured at its respective ends to the frame.

62, denotes two washers fixed to the shaft 61, one on each side of the arm 60 to guide its movement and prevent lateral displacement upon the shaft.

63, is a roller pivotally connected to the arm 60, on one side thereof at or near its center.

64, designates a link bar, one end of which is connected with the upper end of the arm 60 by a swivel joint 65 and the other end connected to the free end of the crank-arm 58 by a swivel joint 66.

67, indicates a cam keyed upon the main shaft 21, and contacting with the roller 63 on the arm 60 by means of which the arm 42 is swung from its normal position above the bed 16 across the top of the glue box 18, and over the wrapper holder 19, it being in perfect alinement with the wrapper box at its extreme outward movement.

The arm 42 is drawn back to its position above the bed 16 by means of a spiral spring 68, one end of which is secured to the arm 60; its other end being secured to a cross beam 69 of the frame.

70, indicates a horizontal lever fulcrumed at 71, upon a shaft 72 secured at its ends to the frame. 73, is a roller pivoted to one side of the lever 70 at or near its center. 74, indicates a cam keyed to the main shaft 21, and acting upon the roller 73 on the lever 70. The free end of the lever 70 is preferably provided with a hardened steel contact plate 75 upon which the lower end of the vertical shaft 43 rests; this end of said shaft is preferably provided with a hardened steel point 76.

When the wrapper carrier is in a position directly over the pad 57, on the bed 16 and ready to deposit a wrapper thereon, a reduced portion of the periphery of the cam 74 is in contact with the roller 73, on the lever 70, whereby the carrier arm is supported the desired distance above the pad, but as the carrier or arm 42 is being swung from over the bed toward the wrapper box 19 by the means above described, a slightly increased portion of the periphery of the cam 74 rides over the roller 73 on the levers sufficiently to slightly raise the carrier so that in passing over the paste or glue roller 33 only the under surfaces of the projections or glue collecting strips 45 contact with the revolving glue roller, and at the time the carrier or arm 42, reaches its extreme outward movement directly over the wrapper box, another reduced portion of the periphery of the cam 74 is in contact with the roller 73 allowing the carrier by the action of the spring 59 to descend the desired distance to bring the glued surfaces in contact with the uppermost wrapper in the box 19, and in the further movement of the cam 74 its greatest periphery contacts with the roller 73 raising the carrier to its highest elevation, with the top wrapper adhering to the glued projections; this portion of the periphery of the cam 74 rides over the roller during its return movement, so that the carrier and adhering wrapper clear the glue roller 73.

The construction and operation of the wrapper carrying arm and its mechanism are best illustrated in the detail views Figs. 5 and 7.

At the moment the carrier arm 42 with the adhering wrapper reaches the position directly over the pad 57 upon the bed 16, the wrapper is released and deposited upon the pad 57 by the release plate 50 which is operated as follows:

77, designates a horizontal lever similar to the lever 70, and fulcrumed upon the same shaft 72 there being a spacer 78 upon said shaft between the two levers. 79, is a roller pivoted to one side of the lever 77 at or near its center.

The free end of the lever 77 is preferably provided with a hardened steel contact plate 80, which contacts with the lower end of the vertical rod 46 which is preferably provided with a hardened steel point 81.

83, indicates a cam keyed to the main shaft 21 and acting upon the roller 79 on the lever 77 by means of which the rod 46 is raised compressing the spring 55 and tipping the lever bar 47 forcing downward the release plate 50 which pushes the wrapper away from the projections 45 on the carrier arm 42 and deposits it upon the pad 57, on the bed 16. The enlarged portion of the periphery of the cam 83 having now passed the roller 79 on the lever 77, the rod 46 is forced down by the expansion of the spring 55, the release plate 50 being thereby drawn back into the opening in the carrier 42. Fig. 6 illustrates the wrapper release mechanism in detail.

The bottles 84, or other cylindrical articles to be covered by the wrappers are fed to the bed of the machine at a point adjacent one edge of a wrapper which has been deposited thereon as aforesaid, by any suitable mechanism, but I prefer to employ a chute 85, for holding the bottles, and a pusher 86 by which they are pushed one at a time from the chute upon a bed 82, which is then elevated to a level with the upper surface of the bed 16 through an opening 11 in said bed.

The wrapper is then to be applied to the bottle by suitable means; I prefer to employ a wrapping block 125 suspended a predetermined distance above the top of the bed 16, by connections 138 and 139, to horizontal arms 120 and 121, extending from a hub 119 keyed to the upper end of a rotatable shaft 116, which gives the wrapping block a circular movement over the bed and brings it in contact with the periphery of the bottle which is thereby rolled over the gummed wrapper.

It is preferable that the wrapper holder or box 19 be of a shape corresponding with the shape of the wrappers. The sides of the box at the bottom are secured to the top of the bed 17 by any suitable means.

The bottom 161 of the box is movable vertically within the box and acts as a follower to push the wrappers toward the top of the box.

This may be accomplished by any suitable means, but I prefer to connect a rack-bar 162 to the follower 161, which rack-bar is acted upon by a gear 181 fixed upon a rotating shaft 180.

I claim as my invention.

1. In a wrapping machine, in combination, a frame and bed supported thereby, a wrapper holder, a paste roller located between said bed and said wrapper holder, a wrapper carrier, a vertical shaft to the top of which said carrier is fixed, means for giving a partial rotation to said shaft whereby said carrier is swung outward from the bed and over said wrapper holder, and lowered to engage said paste roller during such movement, means for lowering said carrier in contact with the uppermost wrapper in said holder and then raising it, and means for returning said carrier clear of the paste roller to its normal position over the bed.

2. In a wrapping machine, in combination, a frame, and bed supported thereby, a wrapper holder, a paste roller located between said bed and said wrapper holder, a wrapper carrier provided with paste collecting strips on its under side, a vertical shaft to the top of which said carrier is fixed, means for giving a partial rotation to said shaft whereby said carrier is swung outward from the bed across said paste roller and over said wrapper holder, said strips contacting with the paste roller during said movement, means for lowering said carrier so that the glued strips contact with the uppermost wrapper in said holder, and then raising it, and means for returning said carrier clear of said paste roller to its normal position over the bed.

3. In a wrapping machine, in combination, a frame and bed supported thereby, a wrapper holder, a paste roller located between said bed and said wrapper holder, a wrapper carrier, a release plate connected to said carrier and movable therewith, a vertical shaft to the top of which said carrier is fixed, means for giving a partial rotation to said shaft whereby said carrier is swung across said paste roller and above said wrapper holder, means for lowering said carrier in contact with the uppermost wrapper in said holder and then raising it, means for returning said carrier clear of said paste roller to its normal position over the bed, means for depressing said release plate while the carrier is in such position, and means for afterward raising it.

4. In a wrapping machine, in combination, a frame and bed supported thereby, a wrapper holder, a paste roller located between said bed and said wrapper holder, a wrapper carrier provided with paste collecting strips on its under side, a release plate connected to said carrier and movable therewith, a vertical shaft to the top of which said carrier is fixed, means for giving a partial rotation to said shaft whereby said carrier is swung outward from the bed across said paste roller and above said wrapper holder, said collecting strips contacting with the paste roller during said movement, means for lowering said carrier so that the glued strips contact with the uppermost wrapper in said holder and then raising it, means for returning said carrier clear of said paste roller to its normal position over the bed, means for depressing said release plate while the carrier is in such position, and means for again raising it.

5. In a wrapping machine, in combination, a frame and bed supported thereby, a wrapper holder, a paste roller, a wrapper carrier, a vertical shaft to the top of which said wrapper carrier is fixed, a bracket supporting said shaft, a crank arm secured to said shaft, a spiral spring surrounding said shaft between said bracket and crank arm, a vertical arm pivoted at its lower end, a roller connected to said arm, a link-bar, a swivel joint connecting one end of said link-bar with the upper end of said arm, a swivel joint connecting the other end of said link-bar with the free end of said crank arm, a drive shaft, a cam keyed thereto and contacting with said roller by means of which the wrapper carrier is swung outward across the paste roller and over the wrapper holder, a shaft, a lever fulcrumed thereon and upon which the free end of said vertical shaft rests, a roller attached to said lever, a cam keyed to the drive shaft and acting upon said roller whereby the wrapper carrier is given a regulated vertical movement, and a spiral spring for drawing the carrier back over the bed of the machine.

6. In a wrapping machine, and in combination, a frame and bed supported thereon, a swinging wrapper carrier, means for supporting the same above the bed, said carrier comprising an arm with an opening at its free end, a release-plate arranged within said opening, a vertical rod passing through an opening in the carrier arm, a lever bar pivotally connected at one end to the upper end of said rod and fulcrumed between lugs upon the top of said arm, the other end of said lever being pivotally connected to a lug upon the top of said release plate, a shaft supported by the frame, a lever fulcrumed upon said shaft and upon the free end of which the lower end of said vertical rod rests, a roller attached to said lever, a drive shaft, a cam keyed thereto and acting upon said roller by means of which said release plate is depressed, and means for returning said plate to its normal position.

Signed by me this 21st day of February, 1917.

GILBERT F. HELSON.

Copies of this patent may be obtained for five cents each, by addressing the "Commissioner of Patents, Washington, D. C."